Figure 1:
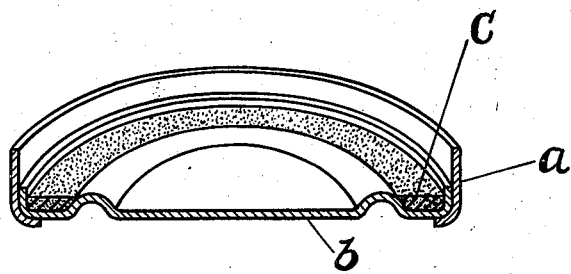

July 21, 1936.  W. I. McGOWAN  2,047,977
SEAL FOR CONTAINERS
Filed April 13, 1933

INVENTOR
William I. McGowan

Patented July 21, 1936

2,047,977

UNITED STATES PATENT OFFICE 2,047,977

SEAL FOR CONTAINERS

William I. McGowan, Cambridge, Mass., assignor to Dewey and Almy Chemical Company, North Cambridge, Mass., a corporation of Massachusetts Application April 13, 1933, Serial No. 665,940

19 Claims. (Cl. 215—37)

This invention relates to sealing compositions for use with closures for containers such as glass jars or metal cans, more particularly to closures which screw or lift off the container body to which they are attached; and it generally comprises the use of a rubber sealing composition containing a lubricant which is adapted to reduce the coefficient of friction between the sealing compound of the closure and the contacting surface of the container and to prevent adhesion of the sealing material to the substance of the container when held in pressure contact therewith over long periods of time, all as more fully hereinafter described and claimed.

It is common practice to employ compositions which contain rubber together with suitable compounding or filling materials to effect a tight joint between the body of a container such as a glass jar or metal can and its closure or lid. In some cases a gasket is died from a rubber sheet or sliced from a rubber tube to fit the space provided by the closure for the sealing composition; in other cases a gasket is formed in situ by flowing a liquid rubber composition, such as a solvent or latex composition, onto the surface of the closure which is to contact with the body of the container and subsequently removing the liquid vehicle by drying. With certain types of sealed containers, such as those having covers which screw or lift off, it is usual, when the sealed container is opened, to break the joint effected by the rubber sealing gasket between the closure and the body of the container; but in other types, such as the double-seamed can, which are commonly opened by making an incision in the metal by means of a can opener, the tight joint effected by the sealing composition generally remains undisturbed during the opening process.

This invention relates particularly to the first mentioned class of containers. For use with them the heretofore employed rubber sealing compositions are objectionable because they tend to adhere more or less firmly to the substance of the container body when held in pressure contact therewith for long periods of time and thereby make it difficult or well nigh impossible to separate the closure from the adhering body of the container, especially when closures of the one-piece screw top type are employed. And even when adhesion does not actually occur, closures of the latter type are, due to the high coefficient of friction presented by the rubber sealing materials formerly used, frequently extremely difficult to unscrew or remove from the bodies of the containers to which they are attached. Furthermore, closures of the one-piece screw top type also present the additional objection that the shearing force required, as the case may be, either to overcome the frictional engagement or to rupture the adhesive union between the cover and body of the container frequently leads to a tearing or scuffing of the sealing material which disruption of surface continuity unsuits it to yield a tight joint when the closure is again applied.

Attempts have been made to overcome the stated difficulties by coating the sealing gasket with a suitable lubricant such as castor oil. This procedure is objectionable, however, because it is expensive, frequently leads to undesirable contamination of the contents of the container by the coating material, and is ineffective when a long period of time elapses between the sealing of the container and its subsequent opening, or, as obtains with vacuum sealed containers, when the sealing composition is subjected to heavy pressure which tends to squeeze or express the superficial coating of lubricant from between the sealing material and the parts with which it contacts to afford a tight joint.

An object of this invention is to provide for use particularly with container closures of the type mentioned a rubber sealing composition which inherently will not lead to objectionable adhesion or to a high coefficient of friction between the body of a container and its closure. Another object is to afford for use with closures of the screw top type a sealing material which will not scuff or tear when the container is opened. Still another object is to provide rubber sealing compositions derived in situ from latex which will be free from the stated difficulties. Yet other objects and advantages of the invention will become apparent with its more detailed description.

I have discovered that the foregoing objects are attained by and new advantages accrue from the use with container closures of a rubber sealing material which contains a suitable lubricant. The lubricants which are adapted to my purposes are characterized not only by the facts that they reduce the coefficient of friction between the sealing material and the contacting surface of the container and that they prevent adhesion of the rubber sealing gasket to the contacting surface but also by the fact that they do not exert an adverse influence on the rubber of the composition. Oils which are strongly solvent of rubber or which deleteriously influence its aging properties should be avoided. I have found that the following substances lead to very satisfactory results: solid hydrocarbons such as paraffin and ceresin (refined ozokerite); waxes such as beeswax, carnauba wax, candelilla wax, Montan wax, Chinese insect wax, and lanolin (wool grease); oils or fats (liquid or solid glycerides of the higher fatty acids) such as castor oil and Japan wax which have substantially no solvent influence or other adverse effect on rubber. In milled rubber mixtures of two or more of the materials just named are often advantageous, but as shown in Example 1, I prefer to use a substance such as castor oil which is completely immiscible in rubber.

Rubber sealing compositions which contain lubricants in accordance with this invention may be prepared and applied according to any of the general manipulative procedures formerly employed. The chosen lubricant may be present in a rubber sheet or tube from which sealing gaskets are to be cut, or in a solvent rubber sealing composition, or in a latex sealing composition; but for the reasons described later on in this specification, I prefer and particularly recommend the last procedure. When the lubricant is to be present in a sheet or tube from which gaskets are to be cut, it may be milled into the rubber composition together with the usual filling and compounding ingredients. The milled mass is then, in known manner, formed into a sheet or tube, which is vulcanized if desired, and gaskets cut therefrom. When the lubricant is to be present in a solvent rubber composition, it may first be milled into a rubber composition and then the masticated mixture dissolved in a solvent; or it may be dispersed in a preformed solvent rubber compound. When the lubricant is to be present in a latex composition, it may be emulsified in an aqueous medium and the emulsion added to a latex sealing composition prepared according to any of the known processes; or, in some cases, as illustrated by Example 3 given below, the lubricant may be added to the latex composition directly and then emulsified in the latter by means of a simple, stirring procedure. In either case the viscosity or consistency of the resulting latex composition may be adjusted in known ways to meet the conditions at hand.

I have found in general that, depending on the lubricant employed and the amount of non-rubber constituents present, a ratio of lubricant to rubber of not less than 10 or more than 35% yields satisfactory results; and I generally prefer to employ about 20%. The larger quantity should be used when an unusually high percentage of non-rubber constituents is present or a relatively hard lubricant, such, for example, as carnauba wax, is employed.

Whereas my invention possesses advantages for use with all kinds of rubber sealing compositions whether of the cut gasket, solvent rubber, or latex type, it possesses by far the greatest advantages when used with latex sealing compositions. This is believed to be due to the fact that they provide rubber for sealing purposes in its toughest and least adhesive form; and also to the fact that they yield dried films which are believed to have a micro-sponge-like or reticulate rubber structure which serves as a microporous wick to hold the lubricant and feed it to the contacting surface in some proportionate relation to the applied pressure. It is also my hypothesis that the adsorbed protective colloids which are always present in latex compositions prevent any intimate contact of the emulsified lubricant with the colloidally dispersed rubber which might result in an objectionable softening of the rubber component such as sometimes occurs when the lubricant is milled into the rubber composition, particularly when the selected lubricant has some slight solvent influence on the rubber. But whatever the true explanation may be, sealing compositions prepared from latex in accordance herewith afford sealing gaskets which have even less tendency to stick to glass or metal surfaces when held in pressure contact therewith for long periods of time, and which present even lower coefficients of friction when in contact with the said surfaces than rubber sealing compositions made by other methods in accordance herewith.

The expression "latex sealing composition" as used herein means any sealing composition prepared from an aqueous dispersion of rubber, whether of natural or artificial origin.

For the purpose of further illustrating this invention the following examples are given for preparing rubber sealing compositions for use in accordance therewith. I wish it to be understood, however, that the invention is not restricted to the particular compositions described in the examples.

Example 1

The following ingredients are milled together on a rubber mill in accordance with usual rubber compounding practice until a uniform mixture is obtained:

| | Parts |
|---|---|
| Smoked sheet | 350 |
| Clay | 500 |
| Castor oil | 70 |
| Zinc oxide | 35 |
| Sulfur | 10½ |
| Diphenyl guanidine (accelerator) | 3½ |

The masticated mass is formed into a sheet of desired thickness and vulcanized for twenty minutes under a gauge steam pressure of 40 pounds per square inch. Sealing gaskets of the desired size are then cut from the vulcanized sheet.

The milled rubber composition just described is characterized by relatively low elasticity, i. e., while it is resilient, its plasticity characteristic is substantially more pronounced than ordinary milled rubber in the absence of the lubricating agent. Its plasticity or low elasticity is comparable to the well known low elasticity of latex compounds such as are described herein and it is believed that the inclusion of castor oil imparts this result.

Example 2

A latex composition is first prepared as follows. The ingredients listed below are placed in a ball mill and ground to a smooth pasty consistency:

| | Parts |
|---|---|
| Aluminum oxide | 35.40 |
| Bentonite | .25 |
| Sodium silicate (40% solution) | 2.00 |
| Phenyl beta-naphthylamine (antioxidant) | .10 |
| Concentrated ammonia water | .50 |
| Water | 11.75 |
| Total | 50.00 |

The ground slurry is then stirred into 40 parts of concentrated latex (revertex) which contains approximately 74% solids.

Into 10 parts of the resulting latex composition (which merely exemplifies for the purposes of this example the latex sealing compositions which have been prepared heretofore and which, by itself, forms no part of the invention), which has been heated to 65° C., is then slowly stirred an emulsion which has previously been made by melting .6 part of diglycol stearate together with 5.4 parts of paraffin and stirring the molten mixture with 4 parts of water at about 65° C. until a homogeneous material is obtained. The mixture of emulsion and latex composition is then thoroughly mixed at room temperature with the remaining 80 parts of the latex compound. The material is then ready for use in accordance with this invention.

*Example 3*

Six parts of castor oil is slowly stirred into 90 parts of the typical latex composition prepared according to the detailed procedure given in the first part of Example 2 above. The castor oil readily emulsifies in the latex compound to afford a mutual dispersion of the lubricant, rubber, and solids suitable for the purposes of this invention.

Figure 2:
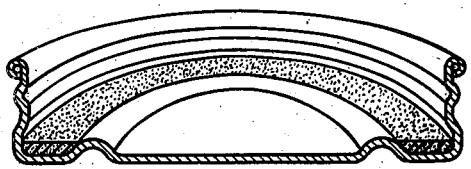

In the drawing are illustrated two types of container closures to which this invention is applicable. It will be apparent, however, to those skilled in the art that the invention may be used with advantage with other types of closures, or with modifications of the types shown. Figure 1 represents a band closure in which the band *a* serves to hold the cap *b*, or more particularly the gasket of sealing composition *c* in operative contact with the body of the container (not shown). Figure 2 shows a one-piece screw top closure for use with which, as previously stated, this invention possesses special advantages.

I wish it to be understood that the words "screw top closure" as used herein are employed in a broad generic sense and are intended to mean any closure, regardless of whether provided with threads or not, which is removed from the body of a container by a turning movement which necessitates motion between the substance of the closure, or the substance of the body of the container, and the gasket of rubber sealing composition which is interposed between the two.

It should be understood that the present disclosure is for the purpose of illustration only and that this invention includes all modifications and equivalents which fall within the scope of the appended claims.

I claim:

1. A container closure adapted to be applied and removed by a turning movement comprising a skirt having retaining means thereon and a top, said closure having therein a sealing gasket comprising a vulcanized rubber-like composition having included as an ingredient therein a lubricating material which provides a non-adhesive anti-frictional sealing surface.

2. A one-piece cap of the screw or lug type having a depending skirt and top and having a sealing gasket comprising a vulcanized rubber-like composition provided with a non-adhesive anti-frictional surface formed by a lubricating material included as an ingredient in the gasket composition.

3. A cap of the screw or lug type comprising a top and a skirt provided with retaining means and having therein a sealing gasket comprising a vulcanized rubber composition containing as an ingredient a lubricating element forming a surface bloom of lubricating material.

4. In combination, a container, a cap on said container adapted to be removed by turning movement and a sealing gasket between said cap and container comprising a vulcanized rubber-like composition having included as an ingredient therein a lubricating element which provides a non-adhesive anti-frictional sealing surface.

5. A container closure adapted to be applied and removed by a turning movement comprising a skirt having retaining means thereon and a top, said closure having therein a sealing gasket comprising a resilient compound having as an ingredient therein a lubricating material which provides a non-adhesive anti-frictional and permanent surface film.

6. A container closure provided with a sealing material deposited thereon comprising as its basis dried latex containing a dispersed lubricant.

7. A container closure provided with a sealing material deposited thereon comprising as its basis dried latex containing dispersed wax.

8. A container closure provided with a sealing material deposited thereon comprising as its basis dried latex contained dispersed paraffin.

9. A container closure provided with a sealing material deposited thereon comprising as its basis dried latex containing dispersed castor oil.

10. A container closure of the screw top type provided with a sealing material deposited thereon comprising as its basis dried latex containing a dispersed lubricant.

11. A container closure of the screw top type provided with a sealing material deposited thereon comprising as its basis dried latex containing dispersed wax.

12. A container closure of the screw top type provided with a sealing material deposited thereon comprising as its basis dried latex containing dispersed paraffin.

13. A container closure of the screw top type provided with a sealing material deposited thereon comprising as its basis dried latex containing dispersed castor oil.

14. A container provided with a removable closure, and a sealing material forming a tight joint between the container and the closure comprising as its basis dried latex containing a dispersed lubricant, whereby a non-adhesive, anti-friction joint is provided between the sealing material and the container.

15. In combination a container, a cap on said container adapted to be removed by turning movement and a sealing gasket between said cap and container comprising a rubber-like composition having included as an ingredient therein a lubricating agent which is completely immiscible in rubber and which provides a non-adhesive anti-friction sealing surface.

16. A container closure provided with a sealing gasket comprising a resilient compound having as ingredients therein rubber and a surface-film-forming lubricating material which is completely immiscible in rubber.

17. A container closure provided with a sealing gasket comprising a resilient compound having as ingredients therein rubber and castor oil, whereby a lubricating film exists upon the surface of said compound.

18. A cap of the screw or lug type comprising a top and a skirt provided with retaining means and having therein a sealing gasket comprising a vulcanized milled rubber composition containing as an ingredient a lubricating element forming a surface bloom of lubricating material, said milled rubber composition having a relatively low elasticity.

19. A container closure comprising a skirt having retaining means thereon and a top, said closure having therein a sealing gasket comprising a vulcanized rubber-like composition having included as an ingredient therein a lubricating material which provides a non-adhesive anti-frictional sealing surface, said rubber-like composition having a relatively low elasticity.

WILLIAM I. McGOWAN.

CERTIFICATE OF CORRECTION.

Patent No. 2,047,977.                                              July 21, 1936.

WILLIAM I. McGOWAN.

It is hereby certified that error appears in the printed specification of the above numbered patent requiring correction as follows: Page 3, second column, line 13, claim 8, for the word "contained" read containing; and that the said Letters Patent should be read with this correction therein that the same may conform to the record of the case in the Patent Office.

Signed and sealed this 6th day of October, A. D. 1936.

(Seal)

Henry Van Arsdale
Acting Commissioner of Patents.